United States Patent
Van Der Leest et al.

(10) Patent No.: US 7,431,674 B2
(45) Date of Patent: Oct. 7, 2008

(54) CONTINUOUSLY VARIABLE TRANSMISSION

(75) Inventors: Adrianus Johannes Wilhelmus Van Der Leest, Nistelrode (NL); Johannes Gerardus Ludovicus Maria Van Spijk, Drunen (NL)

(73) Assignee: Van Doorne's Transmissie B.V., Tilburg (NL)

( * ) Notice: Subject to any disclaimer, the term of this patent is extended or adjusted under 35 U.S.C. 154(b) by 431 days.

(21) Appl. No.: 10/538,932

(22) PCT Filed: Dec. 10, 2003

(86) PCT No.: PCT/NL03/00878

§ 371 (c)(1),
(2), (4) Date: Jun. 13, 2005

(87) PCT Pub. No.: WO2004/053361

PCT Pub. Date: Jun. 24, 2004

(65) Prior Publication Data

US 2006/0058125 A1  Mar. 16, 2006

(30) Foreign Application Priority Data

Dec. 12, 2002   (NL)  .................................. 1022157

(51) Int. Cl.
*F16H 55/56* (2006.01)
*F16H 7/00* (2006.01)
*F16H 55/36* (2006.01)

(52) U.S. Cl. ............................. 474/8; 474/24; 474/148; 474/166

(58) Field of Classification Search .................... 474/8, 474/24, 148, 166, 12, 11, 17
See application file for complete search history.

(56) References Cited

U.S. PATENT DOCUMENTS 583,402 A * 5/1897 Reeves ........................ 474/31

(Continued)

FOREIGN PATENT DOCUMENTS

EP  1158210  11/2001

(Continued)

*Primary Examiner*—Robert A. Siconolfi
*Assistant Examiner*—Thomas W Irvin
(74) *Attorney, Agent, or Firm*—Young & Thompson

(57) ABSTRACT

Continuously variable transmission provided with a primary pulley and a secondary pulley, around which a drive belt is arranged, clamped between two conical pulley discs of the respective pulley, a running surface of at least one pulley disc of the primary pulley and the secondary pulley, via which running surface this pulley disc contacts the drive belt, being provided, as seen in a cross section oriented perpendicular to a tangential direction, with a curvature, so that a pulley angle between a tangent on the running surface and a radial direction varies between a lowest value at the location of a radially innermost position on the running surface and a highest value at the location of a radially outermost position on the running surface. The curvature of the running surface of the primary pulley and that of the running surface of the secondary pulley differ from one another.

9 Claims, 2 Drawing Sheets

U.S. PATENT DOCUMENTS

| | | | | |
|---|---|---|---|---|
| 2,212,024 | A * | 8/1940 | Johns | 198/819 |
| 2,893,254 | A * | 7/1959 | Grover | 474/23 |
| 3,016,755 | A * | 1/1962 | Dittrich | 474/8 |
| 4,589,859 | A * | 5/1986 | Kanesaka | 474/148 |
| 4,631,042 | A | 12/1986 | Rattunde | |
| 4,795,406 | A * | 1/1989 | Dittrich et al. | 474/8 |
| 5,328,412 | A | 7/1994 | Durum | |
| 5,685,793 | A * | 11/1997 | Van Blaricom | 474/33 |
| 6,206,796 | B1 | 3/2001 | Lee | |
| 6,416,433 | B1 * | 7/2002 | Linnenbrugger | 474/8 |
| 6,656,068 | B2 * | 12/2003 | Aitcin | 474/8 |
| 6,926,631 | B2 * | 8/2005 | Brandsma et al. | 474/8 |
| 2003/0144097 | A1 * | 7/2003 | Brandsma et al. | 474/8 |

FOREIGN PATENT DOCUMENTS

| | | |
|---|---|---|
| JP | 63053352 | 3/1988 |
| JP | 01012167 | 1/1989 |
| JP | 08326859 | 12/1996 |
| JP | 2002031215 | 1/2002 |

* cited by examiner

CONTINUOUSLY VARIABLE TRANSMISSION

The present invention relates to a continuously variable transmission in accordance with the preamble of Claim 1 for transmitting mechanical power between an engine and a load, it being possible for the transmission ratio of the torque level and the rotational speed between the pulleys to be varied continuously within a set range. Transmissions of this type are generally known and are suitable in particular for use in motor vehicles.

As is known, in the transmission the drive belt is clamped between two conical pulley discs of the respective pulleys, the ratio of the radial position of the drive belt in the primary and secondary pulleys, which is also known as the primary and secondary running radii, determining the transmission ratio of the transmission. The size of the abovementioned running radii can be varied in opposite directions by virtue of the fact that one of the pulley discs of each pulley is arranged in such a manner that it can be moved in the axial direction. In the transmission ratio equal to one, the abovementioned running radii of the drive belt are therefore equal to one another, while at a transmission ratio of greater than one the primary running radius is greater than the secondary running radius, and vice versa.

It is known, inter alia from EP-A-0291129, that while the transmission ratio is being varied, the centre of the drive belt, i.e. a position halfway along the axial distance between the pulley discs, shifts in a manner which differs for each pulley. Consequently, the drive belt between the pulleys will, in virtually all possible transmission ratios, not be oriented perpendicular to the pulley axle, i.e. the axial direction, but rather at a small and varying angle with respect thereto. This phenomenon is referred to as the skew running of the drive belt. It is recognized that skew running of the drive belt may have adverse effects on the functioning of the transmission, for example in terms of increased noise production or uneven wear. As a solution to this phenomenon, it is proposed, inter alia in Japanese Patent Application 63-053352, but also, for example, in JP-2002-031215, for the running surface of at least one pulley disc of each pulley, i.e. the contact surface of this disc with the drive belt, as seen in a cross section oriented perpendicular to the tangential direction, to be provided with a curvature. By suitable selection of the said curvature, it is possible to ensure that the drive belt always, i.e. irrespective of the instantaneous transmission ratio of the transmission, advantageously remains oriented substantially perpendicular to the pulley axles.

In some cases, it is also possible to select to partially compensate for the skew running by reducing at least the maximum angle of the drive belt with respect to the axial direction. Moreover, as well as the compensation for skew running, the literature also discloses other phenomena for which the use of running surfaces which are curved to a prescribed extent may be advantageous. In each case, an angle between a tangent on the respective contact surface and a radial direction, which angle is referred to here as the pulley angle, runs from a lowest value at the location of a radially innermost position on the contact surface to a highest value at the location of a radially outermost position on the contact surface.

Although the known transmission fundamentally functions correctly, according to the invention it is still worthy of improvement. In particular, the invention relates to a reduction in the mechanical load on the drive belt during operation of the transmission, in such a manner that its service life and/or maximum load-bearing capacity is improved.

To this end, the transmission according to the invention is characterized in accordance with Claim 1. Surprisingly, in a transmission of this type, the forces which occur between drive belt and pulleys during operation of the transmission are taken into account. The invention is based on the principle that an axially oriented clamping force exerted on the drive belt by the pulley discs for the purpose of torque transmission exerts a radially oriented force component on the drive belt on account of the pulley angle between the pulley disc and drive belt. On account of the fact that this force component is exerted on the two pulleys, the radial position or running radius of the drive belt can remain constant, but at the expense of a tensile force in the drive belt. This tensile force applies a mechanical load to the drive belt, which is in principle undesirable, since this load makes little or no contribution to the transmission of torque between the pulleys. The abovementioned force component and the tensile force in the drive belt resulting therefrom increase as the pulley angle becomes greater. In view of this aspect, it may therefore be deemed advantageous to use the smallest possible pulley angle.

However, a small pulley angle has the significant drawback that in the event of a given deformation of the pulley discs, also known as the expansion of the pulley discs, as occurs during operation under the influence of the clamping force, the drive belt coils inward to some extent in the radial direction between the pulley discs, away from the ideal arcuate path contour. The extent to which this effect occurs is referred to as the radial sag of the drive belt. When this occurs, parts of the drive belt slip with respect to the pulley discs, such that the efficiency of the transmission is adversely affected, which is fundamentally undesirable. Geometric considerations mean that the abovementioned radial sag and the resulting loss of efficiency increase as the pulley angle becomes smaller, as the running radius of the drive belt becomes greater or as the clamping force increases. In view of this aspect, it may therefore be deemed advantageous to use the largest possible pulley angle, certainly at a relatively high running radius.

The invention combines the abovementioned fundamentally contradictory effects in a surprising way, such that the service life and/or robustness of the known transmission is enhanced while its efficiency is not or is scarcely adversely affected. To this end, the invention is partly based on the characteristic feature which arises as a result of the transmission being used in motor vehicles, whereby, during operation, in the lowest transmission ratio—as defined in accordance with the present invention—it is subject to a relatively heavy but brief load, whereas in the highest transmission ratio it is subject to a less heavy load but for a prolonged period of time. The lowest transmission ratio is used when a load, i.e. the motor vehicle, is being accelerated, for example from a stationary position, while the highest transmission ratio is used, for example, after the load has reached a desired, more or less constant speed.

According to the invention, therefore, it can be concluded that it is advantageous if, in the lowest transmission ratio, contact between the pulleys and the drive belt, both on the primary pulley and on the secondary pulley, takes place at relatively low pulley angles, in order to minimize the abovementioned tensile force, and if, in the highest transmission ratio, the opposite applies, in order to minimize the abovementioned radial sag. Although the abovementioned curvature of the running surface of the primary pulley does comply with an advantageous profile of the pulley angle of this nature, according to the invention this is not the case for the secondary pulley. According to the invention, it is advantageous if the highest value for the pulley angle of the secondary pulley is lower than that of the primary pulley. After all, it is this pulley angle which determines the contact between the drive belt and the secondary pulley in the lowest transmission ratio, in which the tensile force effect prevails over the radial sag effect.

In order to leave the range in which the pulley angle of the secondary pulley varies, i.e. the difference between the highest and lowest values for this angle, unchanged, the lowest value for the pulley angle, at a small running radius, should be correspondingly lower. The expectation could be that this would have a correspondingly adverse effect on the efficiency of the transmission in the highest transmission ratio. According to the invention, however, a disadvantageous effect of this nature does not occur or scarcely occurs, since, as has already been noted, the radial sag decreases proportionally to the decreasing running radius, in an initial approximation even to the power of three. Near to the smallest running radius, therefore, little or no radial sag occurs.

Nevertheless, according to the invention in a preferred embodiment of the transmission it may be advantageous for the lowest value of the pulley angle of the secondary pulley not to be correspondingly lower, so that the range of the pulley angle for the secondary pulley is smaller than the range for the primary pulley. This is because a lower limit for the value of the pulley angle is generally necessary in order to realize a radially oriented clamping force component of sufficient magnitude to enable the friction between pulley and drive belt in the radial direction to be overcome, so that the transmission ratio of the transmission can be varied. In addition, in the case of a drive belt designed as what is known as a push belt with at least one continuous flexible ring, over the periphery of which a series of transverse elements, which can move freely over the ring at least in its longitudinal direction, is arranged, sufficient tensile force has to be realized in the ring to enable the torque supplied to be transmitted between the pulleys by means of pushing forces between the transverse elements. This aspect is described in European Patent Publication EP-A 0 931 959. In a particular embodiment of the transmission, the lowest value for the pulley angle of both pulleys is equal, for the above reasons.

To maintain the effect which it is desired to achieve with a curvature of the contact surface in accordance with the prior art, in which the primary and secondary curvature are equal, despite the narrower range of the pulley angle of the secondary pulley, in practice it will often be desirable to increase the range of the pulley angle of the primary pulley accordingly, for example by reducing its lowest value or increasing its highest value. In the former case, according to the invention the efficiency of the transmission will not or will scarcely be adversely affected, since, as has already been indicated above, the discs will scarcely expand in the vicinity of the lowest running radius. In the latter case, according to the invention it is even possible to expect an improved action of the transmission, since the radial sag advantageously decreases in the highest transmission ratio.

The invention is explained in more detail below with reference to the figures and the exemplary embodiments illustrated therein.

Figure 1:
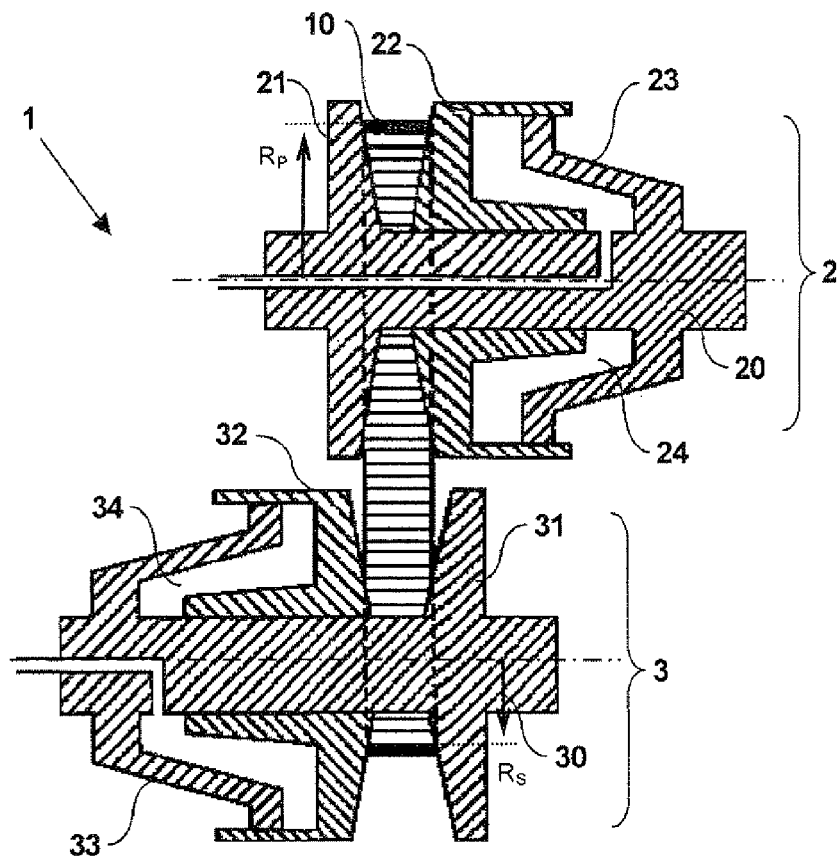
FIG. 1 shows a diagrammatic cross section through a continuously variable transmission of the known type.

FIG. 1 diagrammatically depicts a cross section through the known continuously variable transmission 1. The transmission 1 comprises a primary pulley 2 which can be driven by an engine (not shown) and a secondary pulley 3 which drives a load (not shown), both of which pulleys are provided with a pulley disc 21, 31 which is fixed to the respective pulley axle 20, 30 and with a pulley disc 22, 32 which can be displaced in the axial direction with respect to the said axle 20, 30. A drive belt 10 is clamped between the pulley discs 21, 22, 31, 32, so that mechanical power can be transmitted between the two axles 20 and 30 with the aid of friction. The transmission ratio of the transmission 1 is in this case determined by the ratio of a primary running radius $R_P$ and a secondary running radius $R_S$ of the drive belt 10, i.e. its effective radial position between the pulley discs 21, 22, 31, 32 of the respective pulleys 10 and 20. The running radii $R_P$ and $R_S$ and therefore the transmission ratio $R_P/R_S$ of the transmission 1 can be varied by causing the displaceable discs 22, 32 to move in opposite axial directions along the respective pulley axles 20, 30. In the figure, the transmission 1 is illustrated by way of example with a high transmission ratio, i.e. with a relatively large primary running radius $R_P$ and a relatively small secondary running radius $R_S$.

Figure 2:
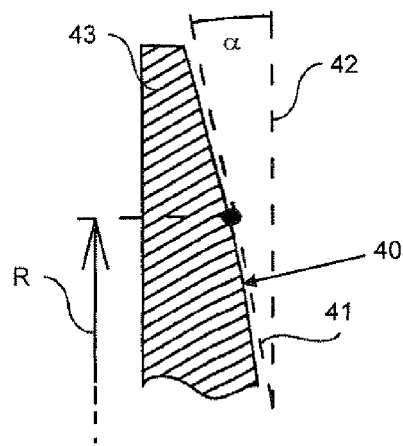
FIG. 2 shows a pulley disc of the known transmission, and in particular its contact surface, in detail.

FIG. 2 shows a more detailed illustration of an arbitrary pulley disc 43 on the basis of a cross section seen in the tangential direction. The running surface 40 or contact surface 40 of the pulley disc 43 is provided with a curvature, with a pulley angle α, defined between a tangent 41 at a point R on the contact surface 40 and a radial direction 42, increasing as seen in this radial direction.

Figure 3:
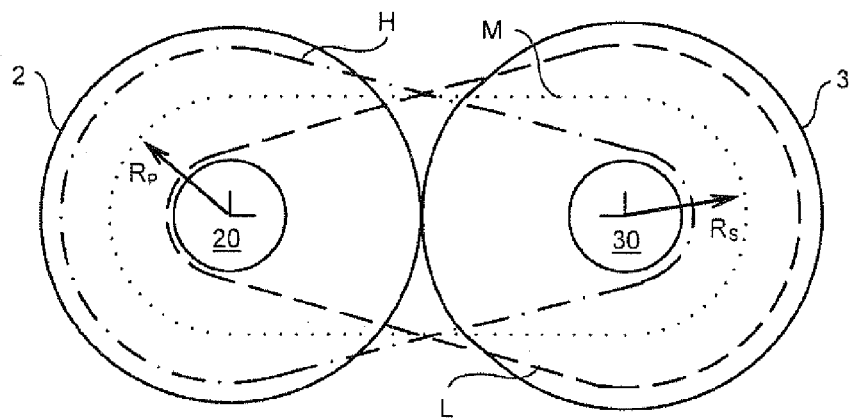
FIG. 3 shows a simplified side view of the transmission shown in FIG. 1.

FIG. 3 shows a side view of the known transmission 1, with the primary pulley 2 with the primary axle 20 on the left-hand side of the figure and the secondary pulley 3 with the secondary axle 30 on the right-hand side of the figure. The lines L, M and H indicate the position of the drive belt 10 in three transmission ratios of the transmission. The dashed line L indicates the lowest transmission ratio, in which the transmission 1, during normal operation, is subject to a relatively short but heavy load, for example when the load, i.e. the motor vehicle, is being accelerated from a stationary position. The dot-dashed line H indicates the highest transmission ratio, in which the transmission 1, during normal operation, is subject to a relatively prolonged less heavy load, for example after the motor vehicle has reached a desired speed. The dot-dashed line M indicates, as an additional example, the transmission ratio equal to 1, in which the primary running radius $R_P$ is equal to the secondary running radius $R_S$ and the primary axle 20 and the secondary axle 30 have the same rotational speed.

Figure 4:
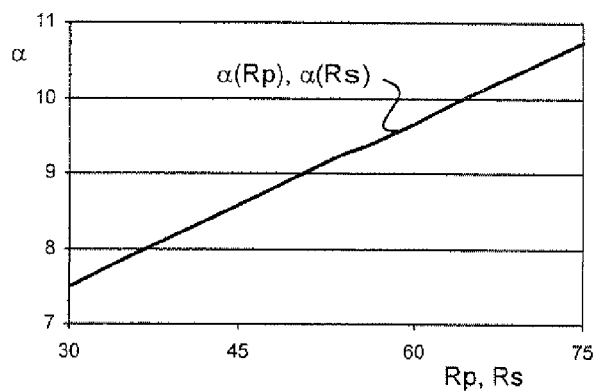
FIG. 4 shows a graph plotting the pulley angle as a function of the running radius of the drive belt for a primary pulley and a secondary pulley in accordance with the prior art.

FIG. 4 shows a graph which plots the pulley angle α—defined in accordance with FIG. 2—of the primary pulley 2 and of the secondary pulley 3 in relation to the respective running radius $R_P$, $R_S$ of the drive belt 10. In this example, the pulley angles in relation to the running radius $\alpha(R_P)$, $\alpha(R_S)$ are given by the known requirement that the drive belt 10, in all possible transmission ratios $R_P/R_S$ be oriented substantially perpendicular to the pulley axles 20 and 30. For both pulleys 2, 3 the pulley angle α varies between approximately 7.5° and 10.8°.

Figure 5:
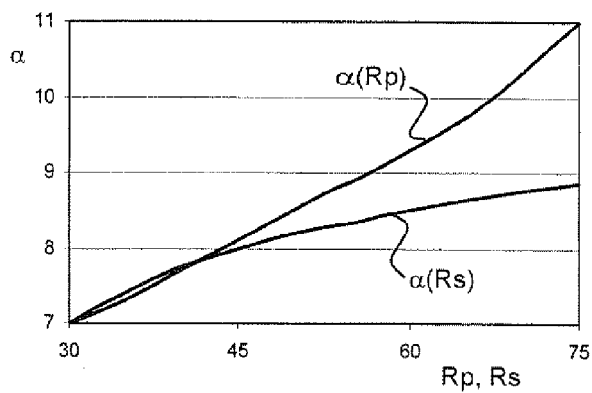
FIG. 5 shows a graph corresponding to FIG. 4 in which the pulley angles are determined in accordance with a possible embodiment of the invention.

FIG. 5 illustrates a similar graph, plotting the pulley angles in relation to the respective running radius $\alpha(R_P)$, $\alpha(R_S)$, but in accordance with a possible embodiment of the invention. According to the invention, the highest value for the pulley angle of the secondary pulley (±8.8°) is advantageously smaller than that of the primary pulley (±11°), while the respective lowest values therefor (±7°) approximately correspond to one another. Compared to the graph shown in FIG. 4, in the transmission according to the invention the range for the pulley angle α for the secondary pulley 3 has become smaller. Nevertheless, the transmission according to the invention can also substantially comply with the requirement given above.

In addition to what has been described above, the invention also relates to all the details shown in the figures, at least to the extent that they are directly and unambiguously recognizable to a person skilled in the art, and to the features described in the set of claims which follows.

The invention claimed is:

1. Continuously variable transmission (1) for motor vehicles, comprising: a primary pulley (2) and a secondary pulley (3), each of the primary pulley and the secondary pulley comprised of two conical pulley discs (21, 22; 31, 32), a drive belt (10) arranged around the primary pulley and the second pulley and clamped between the two conical pulley discs (21, 22; 31, 32) of each respective pulley (2; 3), the drive belt in contact with a first running surface (40) of at least one pulley disc (43) of the pulley discs of the primary pulley (2) and with a second running surface (40) of at least one pulley disc (43) of the pulley discs of the secondary pulley (3), the running surfaces each having, as seen in a cross section oriented perpendicular to a tangential direction, with a curvature, so that a pulley angle (α) between a tangent (41) on the running surface (40) and a radial direction (42) varies between a lowest value at the location of a radially innermost position on the running surface (40) and a highest value at the location of a radially outermost position on the running surface (40), the curvature of the first running surface (40) of the primary pulley (2) and the curvature of the second running surface (40) of the secondary pulley (3) differ from one another by the feature that the highest value for the pulley angle (α) of the secondary pulley (3) at a highest running radius (α(Rs)) is lower than the highest value for the pulley angle (α) of the primary pulley (2) at the same highest running radius (α(Rp)), wherein a range between the highest value and the lowest value for the pulley angle (α) of the secondary pulley (3), over a range of the running radius of the secondary pulley, is smaller than a corresponding range of the pulley angle (α) of the primary pulley (2) over a corresponding range of the running radius of the primary pulley.

2. Transmission (1) according to claim 1, wherein the lowest value for the pulley angle (a) of the secondary pulley (3) is equal to the lowest value for the pulley angle (a) of the primary pulley (2) for corresponding lower running radius of the primary and second pulleys.

3. Motor vehicle having an engine and a load which is to be driven, between which a transmission (1) according to claim 1 is incorporated, a power which is to be generated by the engine being transmitted by the drive belt (10) from the primary pulley (2) to the secondary pulley (3) and being released to the load by the secondary pulley (3).

4. Motor vehicle having an engine and a load which is to be driven, between which a transmission (1) according to claim 2 is incorporated, a power which is to be generated by the engine being transmitted by the drive belt (10) from the primary pulley (2) to the secondary pulley (3) and being released to the load by the secondary pulley (3).

5. Transmission (1) according to claim 1, wherein, in relation to respective corresponding running radius ($\alpha(R_P)$, $\alpha(R_S)$) of the primary pulley and the second pulley, the highest design value for the pulley angle (a) of the secondary pulley (3) is ±8.8° and the highest design value for the pulley angle (a) of the primary pulley (2) is ±11°, and the lowest design value for the pulley angle (a) of the secondary pulley (3) and the lowest value for the pulley angle (a) of the primary pulley (2) is equal to ±7°.

6. Transmission (1) according to claim 1, wherein, in relation to respective corresponding running radius ($\alpha(R_P)$, $\alpha(R_S)$) of the primary pulley and the second pulley, the value for the pulley angle (a) of the secondary pulley (3) ranges from a first lowest value to a highest value of ±8.8°, and the value for the pulley angle (a) of the primary pulley (2) ranges from the first lowest value to a highest value of ±11°.

7. Transmission (1) according to claim 6, wherein, the lowest value for the pulley angle (a) of the primary pulley (2) and of the secondary pulley (3) is equal to ±7°.

8. Transmission (1) according to claim 1, wherein, in relation to respective corresponding running radius ($\alpha(R_P)$, $\alpha(R_S)$) of the primary pulley and the second pulley, an overall range of the values for the pulley angle (a) of the secondary pulley (3) is smaller than an overall range of the values for the pulley angle (a) of the primary pulley (2).

9. Transmission (1) according to claim 8, wherein, the lowest value for the pulley angle (a) of the primary pulley (2) is equal to the lowest value for the pulley angle (a) of the secondary pulley (3).

* * * * *